United States Patent
Moracchioli et al.

(10) Patent No.: US 7,299,642 B2
(45) Date of Patent: Nov. 27, 2007

(54) CRYOGEN/WATER HEAT EXCHANGER AND THE APPLICATION THEREOF TO THE SUPPLY OF GAS TO AN ON-BOARD POWER UNIT IN A VEHICLE

(75) Inventors: Robert Moracchioli, Prunieres (FR); Pierre Briend, Seyssinet (FR); Véronique Grabie, Grenoble (FR); Jacques Chabanne, Claix (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 119 days.

(21) Appl. No.: 10/557,587

(22) PCT Filed: May 18, 2004

(86) PCT No.: PCT/FR2004/001226

§ 371 (c)(1),
(2), (4) Date: Nov. 17, 2005

(87) PCT Pub. No.: WO2004/106833

PCT Pub. Date: Dec. 9, 2004

(65) Prior Publication Data

US 2007/0028627 A1     Feb. 8, 2007

(30) Foreign Application Priority Data

May 27, 2003   (FR)   .................................. 03 06438

(51) Int. Cl.
*F17C 9/02* (2006.01)
*F28F 13/00* (2006.01)

(52) U.S. Cl. ........................................ 62/50.2; 165/146
(58) Field of Classification Search ................. 62/50.2, 62/53.2; 165/146, 157, 166
See application file for complete search history.

(56) References Cited

U.S. PATENT DOCUMENTS

| 3,282,334 A | | 11/1966 | Stahlheber |
| 3,565,201 A | * | 2/1971 | Petsinger .................... 180/69.5 |
| 4,590,770 A | * | 5/1986 | Howard ........................ 62/50.2 |
| 5,035,284 A | * | 7/1991 | Oya et al. .................... 165/146 |
| 5,095,973 A | | 3/1992 | Toy |
| 5,465,785 A | * | 11/1995 | Adderley et al. ........... 165/166 |

FOREIGN PATENT DOCUMENTS

| FR | 2 807 152 | 10/2001 |
| FR | 2 809 805 | 12/2001 |
| WO | WO 01 73366 | 10/2001 |

OTHER PUBLICATIONS

International Search Report for PCT/FR04/001226.

* cited by examiner

*Primary Examiner*—Mohammad M. Ali
(74) *Attorney, Agent, or Firm*—Christopher J. Cronin

(57) ABSTRACT

The invention relates to an exchanger, advantageously a plate exchanger, comprising counter-current parallel exchange sections (8,9). According to the invention, the exchange section for the water (8) has an essentially constant cross-section, whereas the exchange section (9) for the cryogen has a reduced inlet region (9*a*) enabling the possible formation of ice (10) in the water passage (8) to be concentrated on a small volume, without blocking said water passage. The invention can especially be applied to the supply of gaseous hydrogen stored in a liquid form to an on-board power generating device in a vehicle.

11 Claims, 2 Drawing Sheets

CRYOGEN/WATER HEAT EXCHANGER AND THE APPLICATION THEREOF TO THE SUPPLY OF GAS TO AN ON-BOARD POWER UNIT IN A VEHICLE

The present invention relates to cryogen/water heat exchangers designed to heat and/or vaporize a cryogenic fluid at very low temperature by water, of the type comprising a water circuit having an inlet and an outlet and a cryogen circuit having an inlet and an outlet, the circuits having parallel exchange portions that are separated by partitions.

The use of water to heat a cryogenic fluid is economically advantageous, but poses problems in compact exchangers insofar as water, even when mixed with an antifreeze composition, runs the substantial risk of forming ice because of the very low temperature of the cryogenic fluid, any plug of ice causing immediate serious malfunctions in the exchanger and in the downstream user installation.

The object of the present invention is to propose an effective and compact heat exchanger structure that does not have the risk of malfunction due to icing or to the formation of ice in the water circuit.

To do this, according to one feature of the invention, each exchange portion of the cryogen circuit includes an inlet passage of reduced section that opens into a zone of enlarged section, the exchange portion of the water circuit having an approximately constant section corresponding to said enlarged section of the exchange portion of the cryogen circuit.

According to other features of the invention:
- the inlet passage has at least one downstream part with a flared profile;
- the inlet passage is approximately centered on the longitudinal axis of the exchange portion;
- the ratio of the minimum section of the inlet passage to the enlarged section of the exchange portion of the cryogen circuit is between 10 and 50%, typically between 20 and 30%;
- the exchange portions are bounded by adjoining plates, made of stainless steel of small thickness, typically less than 2.50 mm, advantageously less than 2 mm; and
- the inlet passages open into a cryogen delivery pipe extending inside a water distribution box that closes off this side of the exchanger.

The subject of the present invention is also an application of this exchanger to the supply of gaseous hydrogen to a power unit of a motor vehicle, for example an internal combustion engine and/or a proton-exchange membrane fuel cell.

Other features and advantages of the present invention will become apparent from the following description of embodiments, given by way of illustration but in no way implying any limitation, in conjunction with the appended drawings in which.

Figure 1:
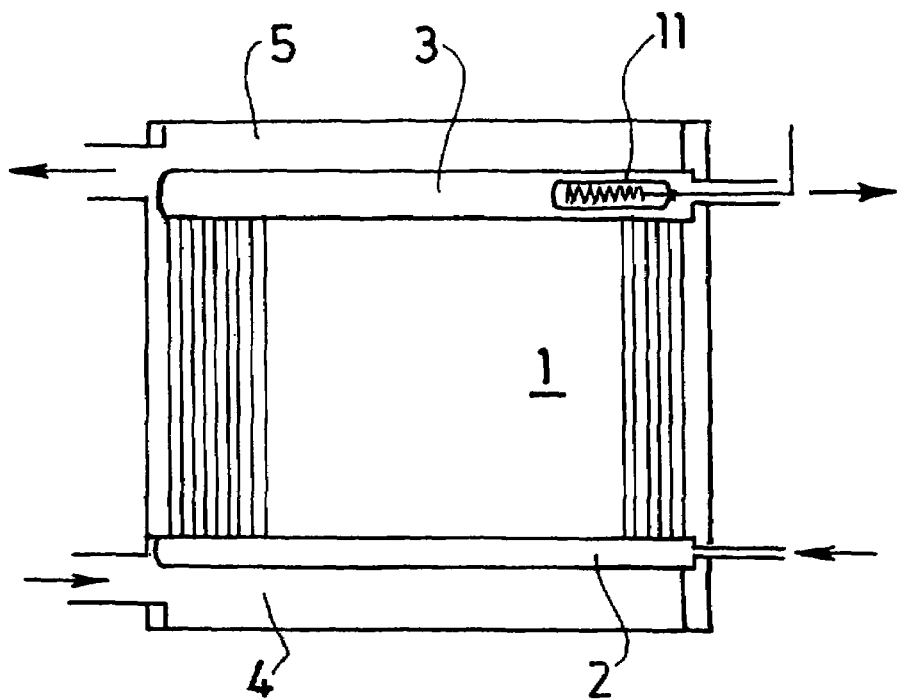
FIG. 1 is a schematic longitudinal sectional view of a heat exchanger according to the invention.

As shown schematically in FIG. 1, the heat exchanger according to the invention comprises an exchange block, denoted overall by the reference 1, formed by an assembly of plates fastened together, as will be seen later, which define portions of circuits for cocurrent parallel exchange between a cryogen inlet manifold 2 and a heated-cryogen outlet manifold 3, on the one hand, and a heating-water inlet manifold 4 and a water outlet manifold 5.

Figure 2:
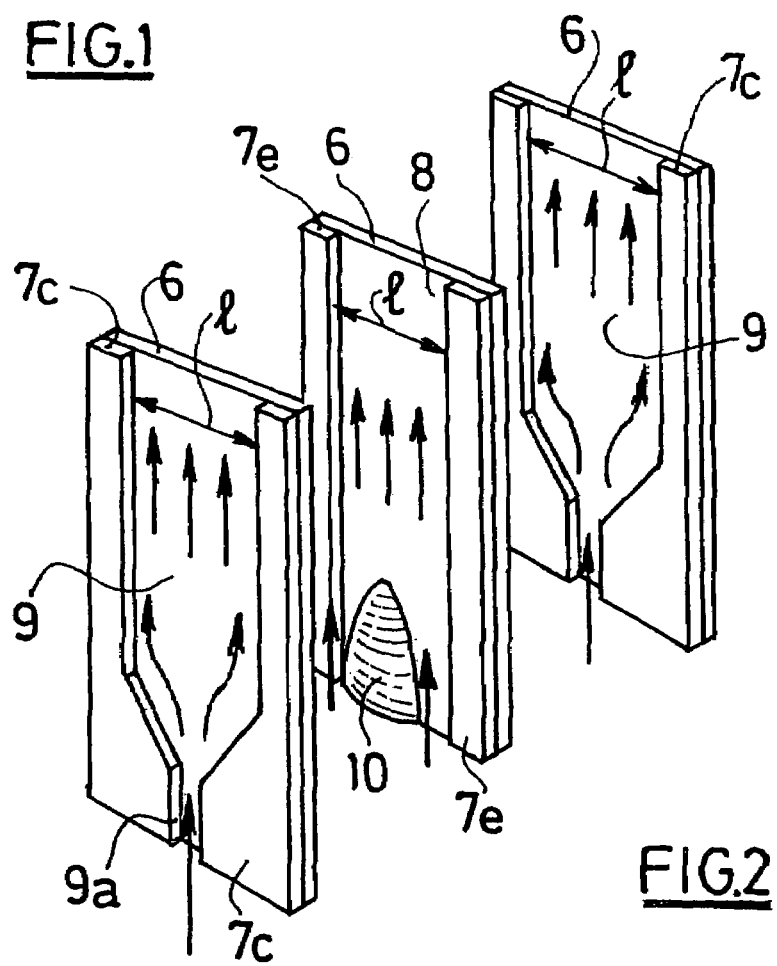
FIG. 2 is an exploded perspective view of the plates of the exchanger of FIG. 1 showing the configurations of the exchange portions of the cryogen and water circuits.
Figure 3:
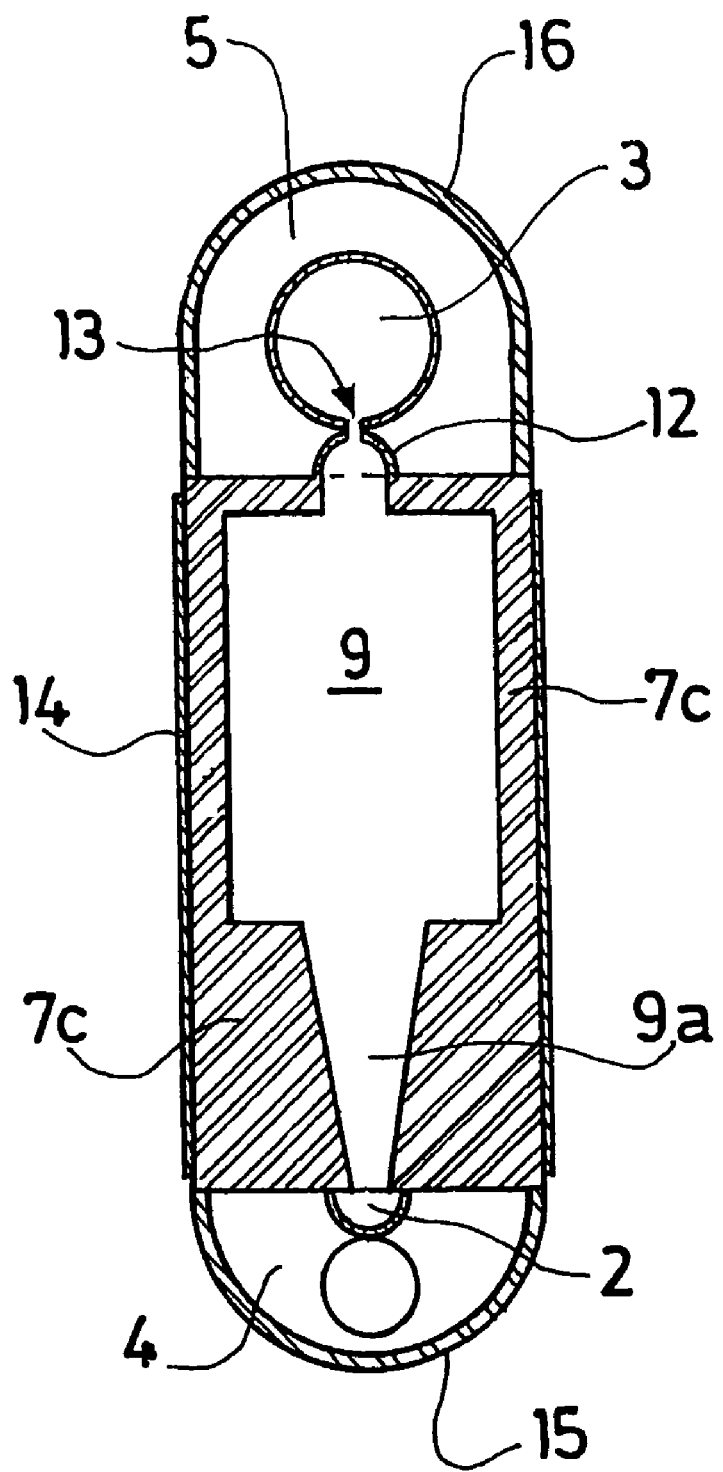
FIG. 3 is a cross-sectional view in the plane of section 3/3 of FIG. 1.

According to one aspect of the invention, as may be better seen in FIGS. 2 and 3, each exchange circuit portion is defined between two solid plates 6 by apertured plates or half-plates 7c for the cryogen circuit and 7e for the water circuit.

According to one aspect of the invention, the plates 7e of the water circuit define a passage of approximately constant width l, whereas the plates 7c define passages 9 of varying profile, with an inlet passage 9a of reduced section that flares out into a main passage of width l identical to that of the water passages 8. The inlet passage 9a is centered on the longitudinal axis of the passage 9 (the longitudinal axes of the passages 8 and 9 advantageously being coplanar).

With such an arrangement, as illustrated in FIG. 2, the extremely cold zone of the cryogen exchange circuit portion, formed by the inlet passage zone 9a, has a reduced width, typically less than 50% of the nominal width l, advantageously greater than 10% of the latter and preferably between 20 and 30% of the latter, so that the water entering cocurrently into the inlet portion of the passage 8 extracts the maximum amount of heat in a central portion, which is itself centered on the inlet passage 9a but extends not very much laterally beyond said portion because of the high temperature gradients on either side of this zone that the surface area of the plates ensures. Under the most unfavorable conditions, at the very most a small block of ice 10 is therefore formed, which occupies only a central part of the width of the passage 8 and never prevents the flow, on either side, of the stream of water as shown by the two arrows in FIG. 2, and resulting in only a small pressure drop in the water circuit.

The plates 6 and 7 are typically made by stamping 316L or 304L stainless steel sheets with a smaller thickness not exceeding 2 mm in the case of the water circuit and not exceeding 1 mm in the case of the cryogen circuit.

For one particular application, suitable for vaporizing liquid nitrogen on board a motor vehicle for supplying a power unit of the latter, the H2L cryogen enters the manifold 2 at a temperature of around −250° C., typically under a pressure of between 1 and 10 bar absolute, with a flow rate of less than 5 g per second. Under these conditions, the plates 7c have a thickness of about 0.5 mm, the plates 7e a thickness of about 2 mm and the plates 6 a thickness of about 0.6 mm. The exchange block 1 is produced by bringing together a plurality of plates 6, 7c and 7e and assembling them by welding their external lateral edges.

In this type of application, the water, coming from the radiator of the internal combustion engine of the vehicle, penetrates the inlet manifold 4 at a temperature below 110° C., typically between 60 and 80° C., and emerges at a temperature slightly below that of the manifold 5, the gaseous hydrogen leaving the manifold 3 at a temperature slightly below that of the water, at around 50 to 60° C. To maintain a gaseous hydrogen temperature within this range, even under very cold atmospheric conditions, an electric heater 11 is advantageously provided in the manifold 3.

In one particular embodiment shown in FIG. 3, there is again the exchange portion 9 of the hydrogen circuit between the plates 7c with, in this case, an inlet passage 9a of V-shaped progressive section opening directly into the main part of enlarged section of the passage 9.

The cryogen intake manifold 2 consists here of a gutter welded to the lower edges of the plates 6 and 7. Similarly, the gaseous cryogen is recovered, at the outlet of the passage 9, in a gutter 12 welded to the upper edges of the plates and welded along an upper generatrix to the outlet manifold 3 with which said gutter 12 communicates via facing openings 13 formed in the contact zones.

The lateral faces, welded together, of the plates 6 and 7 are covered with a protective sheet 14. A box 15 forming the water manifold 4 closes off the bottom of the exchange block 1, while a box 16 forming the water outlet manifold 5 closes off the top of the exchange block.

Although the invention has been described with particular embodiments, it is not limited thereto but is capable of modifications and of variants that will be apparent to those skilled in the art within the context of the claims appended hereto.

The invention claimed is:

1. A cryogen/water heat exchanger comprising a water circuit having an inlet and an outlet and a cryogen circuit having an inlet and an outlet, said circuits having parallel exchange portions that are separated by partitions, wherein each exchange portion (9) of the cryogen circuit includes an inlet passage (9a) that opens into an enlarged zone, a width of the cryogen circuit exchange portion inlet passage being less than a width of the enlarged zone, the exchange portion (8) of the water circuit including a passage having an approximately constant width, wherein the width of the water circuit exchange portion passage is the same as the width of the enlarged zone.

2. The exchanger of claim 1, wherein the inlet passage (9a) has at least one downstream part with a flared profile.

3. The exchanger of claim 1, wherein the inlet passage (9a) is approximately centered on the longitudinal axis of the exchange portion.

4. The exchanger of claim 1, wherein the narrowest width of the inlet passage is between 10% and 50% of the width of the enlarged zone.

5. The exchanger of claim 4, wherein the narrowest width of the inlet passage is between 20% and 30% of the width of the enlarged zone.

6. The exchanger of claim 1, wherein the exchange portions (8, 9) are bounded by plates (7c, 7e).

7. The exchanger of claim 6, wherein the plates (7c, 7e) have a thickness not exceeding 2.5 mm.

8. The exchanger of claim 7, wherein the plates (7c) by which the exchange portions (9) of the cryogen circuit are bounded laterally is less than 1 mm.

9. The exchanger of claim 6, wherein the plates (7c, 7e) are welded to one another by their external edges.

10. The exchanger of claim 1, wherein the inlet passages (9a) open into a cryogen delivery pipe (2) extending inside a water circulation box (4) that closes off this side of the exchanger.

11. The application of an exchanger of claim 1 to the supply of gas to a power unit on board a vehicle.

* * * * *